(No Model.)

2 Sheets—Sheet 1.

C. S. BRADLEY.
PHASE INDICATOR FOR ALTERNATING ELECTRIC CURRENTS.

No. 444,791. Patented Jan. 13, 1891.

WITNESSES

Charles S. Bradley
INVENTOR (No Model.)  
2 Sheets—Sheet 2.

C. S. BRADLEY.
PHASE INDICATOR FOR ALTERNATING ELECTRIC CURRENTS.

No. 444,791. Patented Jan. 13, 1891.

WITNESSES  
Wm H Lowe  
J. C. Spaeth

Charles S. Bradley, INVENTOR  
McTighe & Worthington  
Attorneys.

United States Patent Office.

CHARLES S. BRADLEY, OF YONKERS, NEW YORK, ASSIGNOR TO THE FORT WAYNE ELECTRIC LIGHT COMPANY, OF FORT WAYNE, INDIANA.

PHASE-INDICATOR FOR ALTERNATING ELECTRIC CURRENTS.

SPECIFICATION forming part of Letters Patent No. 444,791, dated January 13, 1891.

Application filed June 23, 1890. Serial No. 356,365. (No model.)

*To all whom it may concern:*

Be it known that I, CHARLES S. BRADLEY, a citizen of the United States, residing at Yonkers, in the county of Westchester and State of New York, have invented certain new and useful Improvements in Phase-Indicators for Electric Currents; and I do hereby declare the following to be a full, clear, and exact description of the invention, such as will enable others skilled in the art to which it appertains to make and use the same.

This invention relates to devices for indicating the degrees of lag existing between two alternating currents, and is also applicable to the determination of the number of alternations per minute which are taking place in a single alternating circuit.

The invention consists in the arrangement and combination of parts, substantially as hereinafter more fully described and claimed.

Figure 1:
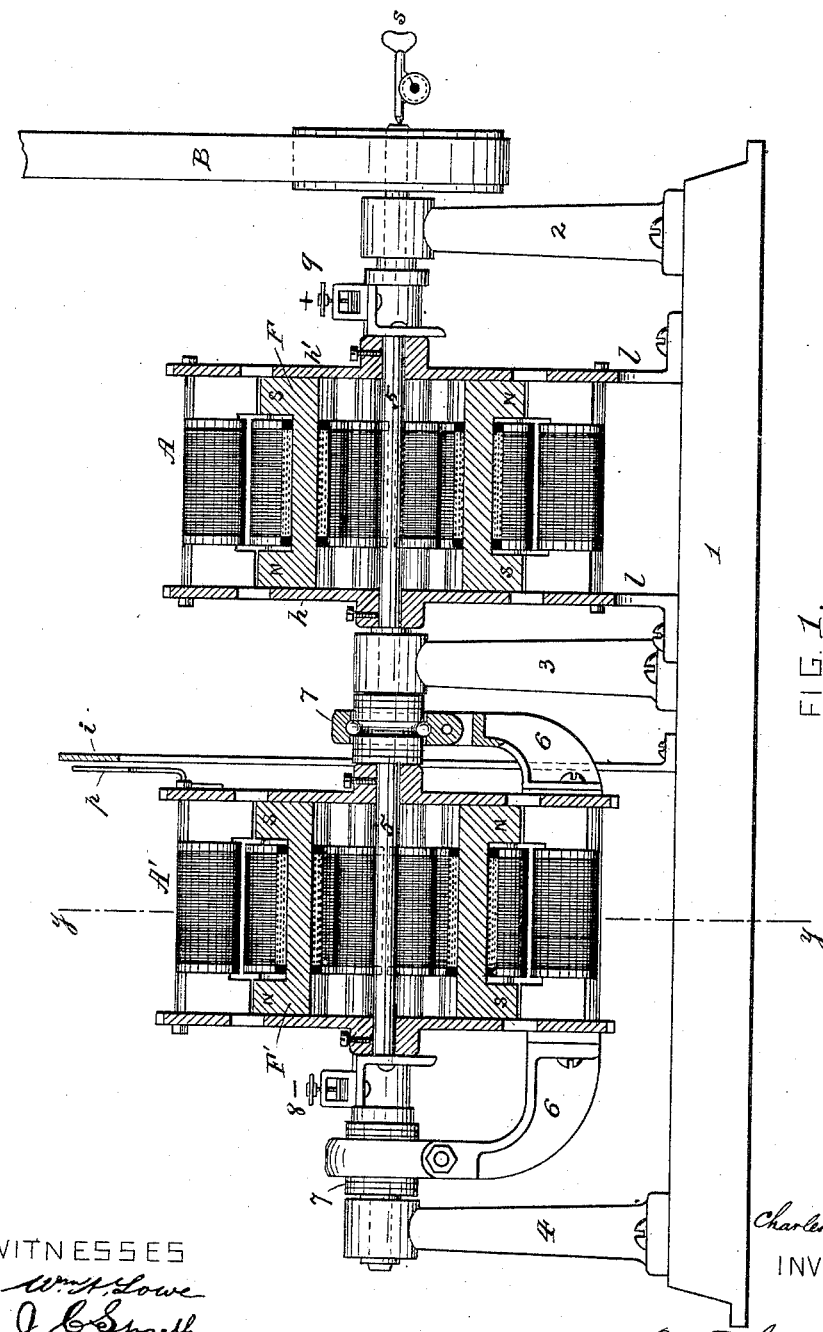
Figure 2:
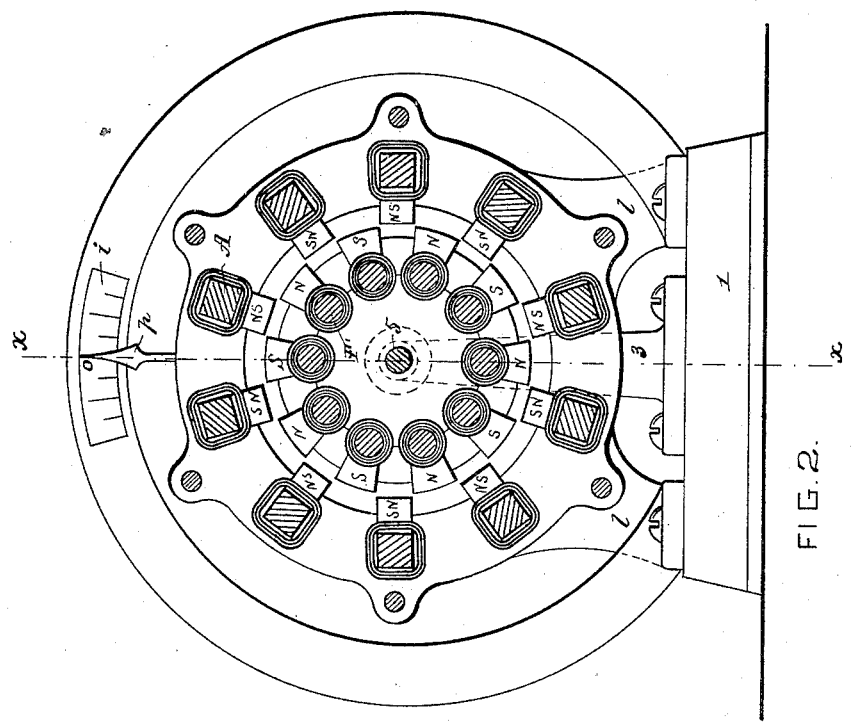

In the accompanying drawings, which form part of this specification, Figure 1 is a longitudinal vertical section of the device on the line $x\ x$ of Fig. 2, and Fig. 2 is a transverse vertical section on the line $y\ y$ of Fig. 1.

On a suitable base 1 I erect the bearings 2 3 4, and in these I journal the shaft 5, carrying two similar multipolar structures, which in this case may be called the "field-magnets" F and F', respetively. These are made up of, preferably, ten straight magnets having the pole-pieces N and S, those of one magnet alternating in position with the next one and all magnets being fixed to the two heads $h\ h'$, which in turn is keyed to the shaft 5 in both cases. Both the field-magnets F F' correspond as to the circumferential position of their component poles. Surrounding the field-magnet F is a similar structure A, which is stationary and attached to the base 1 by means of the lugs $l$, as shown. The magnets of this structure, which I prefer to call the "armature," are turned inwardly, so as to closely approach and correspond in position to the outwardly-extending poles of the rotating field-magnet F. Surrounding the rotating field-magnet F' is another structure A', exactly similar to the armature A in form and in number of poles; but it is hung by means of the arms 6 and ball-bearings 7 on an extension of the adjoining pedestals 3 and 4. The structure A' is thus free to swing about the axis of the shaft 5.

The two rotating field-magnets F and F' are energized by means of a direct current which is carried in at the brush 8 and emerges at brush 9, such current coming from any suitable source of electricity capable of being maintained at a constant strength during the operation of the device.

The swinging armature A' is provided with the pointer $p$, and opposite this I erect from the base 1 the stationary index $i$, which is graduated to indicate one-tenth of a circumference, the fraction of the circumference being determined by the number of poles adapted, which, as stated, is in this case ten.

All the coils on the stationary armature A are connected up in series, as are likewise all the coils on the swinging armature A'. In using the device the direct current is admitted, as stated, through the coils of the rotating field-magnets F and F', which are kept as constant in their strength as possible during the operation.

When there are two differing phase-currents to be determined, I first take one of them at random, and to it I connect the respective circuits of the armatures A and A', the two circuits being connected to the single alternating-current circuit in multiple. The auxiliary motor, operating on belt B, is then started and raised in speed until the field-magnets are synchronous with the alternating generator. When this stage is reached, the machine A will act as an alternating-current motor and resist any tendency to get out of synchronism—a property well understood in alternating-current machines; but although the alternating currents circulating in the armature A will preserve the synchronism, the field-magnets of machine A will have a certain amount of lag with reference to their true theoretical synchronous position, such lag being due to the friction of the bearings, air-resistance, and other causes. The motor operating on belt B is therefore still kept in action and exerts sufficient power upon the shaft 5 to counterbalance this lagging effect and preserve the field-magnets in true synchronism. When this stage is reached, the pointer $i$ stands opposite the zero indication on the scale $p$, and any deflection to one side or the other on the part of this pointer would indicate, although the machine was moving synchronously, that there was some lag. Now the armature A' is cut out of circuit with the same phase which excites armature A and connected in circuit with the other phase of current circulating over the alternating-current mains, the connection of armature A with its phase-current being still preserved. The machine A therefore still continues to preserve the synchronous pace; but inasmuch as the armature A' attains its condition of maximum magnetization a little before or a little after the field-magnets stand in true radial alignment with its cores by reason of the difference of phase circulating in armature A' and armature A, respectively, the field-magnets F' will swing the armature A' on its pivots until the armature A' occupies a position which is truly synchronous with the position of the field-magnet cores at the time the second phase is at a maximum in coils A'. In other words, the machine A preserves synchronism with the alternating generator and gives the field-magnets a radial position at any given instant dependent on the time of one set of waves, whereas the swinging armature A' will be tilted to alignment with the radial position occupied by the field-magnets at the instant the later wave circulating in the alternating-current mains reaches a condition of maximum, and the pointer $i$ will therefore indicate the amount of lag or lead which one set of waves has over the other disconnected from the circuit and connected into the other alternating circuit, which differs in phase from that which is now circulating through the other armature. Immediately the armature A' swings on the ball-bearings so that its pointer $p$ takes a position at some point intermediate between the zero and the end of the scale, which I prefer to subdivide in four divisions, indicating by each division one-fourth of a wave-length. This results from the fact that the waves now circulating through the coils of A' are a little later in point of time, although they have the same periodicity as the waves which circulate through the coils of A, with which the times of presentation of the field-magnet coils is in synchronism. At the instant when the phase-current now passing through the coils of A' is reversing the poles N S of the field-magnet are out of radial alignment, and an attractive effort is thus set up which deflects the swinging armature A' to a position in which it will correspond with the poles of the field-magnet. The pointer $p$ thus at once indicates the degree of lag existing between one of the differential currents and the other. A speed-counter $s$ now applied to the end of the shaft $5$ will determine the number of revolutions per minute which have been given the rotating field F and F', and this number multiplied by one-half the number of pole-pieces gives the number of full periods of alternations which are taking place in the circuit per minute. It will thus be understood that the field-magnets move synchronously with the periodicity of the alternating current and occupy a definite position at any instant depending on the time of one phase. If the same phase excited machine A', the index would stand at zero; but as it is controlled by the other phase, which is of course earlier or later than the first, its armature-cores will be out of line with its field-magnets when the second phase passes, and the field-magnets will exert a torque on the armature—that is to say, the index will be tilted to one side or the other accordingly as its phase is in advance of or behind the phase which controls synchronism.

I claim as my invention—

1. An indicator for showing a difference of phase in two or more alternating currents, comprising a synchronous electric motor operated by one of said currents and a magnetic device controlled by another of said currents, said device co-operating with a rotary element driven by the synchronous motor and adapted to be angularly displaced when corresponding phases of the two alternating currents are not simultaneous.

2. A phase-indicator for alternating currents, comprising an alternating-current motor having its rotary element co-operating with two independent circuits, one of which is fixed and conveys the waves of one alternating current to establish synchronism, and the other of which is movable and carries the waves of a separate alternating current, whereby if the corresponding phases of the two alternating currents are not simultaneous the degree of variation will be indicated by a deflection of the movable circuit.

3. A phase-indicator for alternating currents, consisting of two rotating multipolar field-magnets supplied with direct current and arranged in operative relation, one to a stationary multipolar armature connected to one alternating circuit, so as to preserve synchronism, and the other in operative relation to a similar but swinging multipolar armature connected with the other alternating circuit, and an index for showing the angular displacement of said armatures upon the passage of current.

4. In a phase-indicator for alternating currents, the combination of two rotating multipolar field-magnets supplied with direct current and arranged in operative relation, one to a stationary multipolar armature connected to one alternating circuit, so as to preserve synchronism, and the other in operative relation to a similar but swinging multipolar armature connected with the other alternating circuit, an index for showing the angular displacement of said armatures, and a motor adapted to drive said field-magnets and having variable speed and torque.

In testimony whereof I affix my signature in presence of two witnesses.

CHARLES S. BRADLEY.

Witnesses:
T. J. McTIGHE,
E. C. GRIGG.